US012754081B2

(12) United States Patent
Aeschliman

(10) Patent No.: US 12,754,081 B2
(45) Date of Patent: Oct. 6, 2026

(54) DUAL-USE LEVEL AND TEMPERATURE PROBE

(71) Applicant: Goodrich Corporation, Charlotte, NC (US)

(72) Inventor: Carl R. Aeschliman, Wadsworth, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 497 days.

(21) Appl. No.: 18/335,348

(22) Filed: Jun. 15, 2023

(65) Prior Publication Data

US 2024/0418577 A1 Dec. 19, 2024

(51) Int. Cl.

*G01K 7/22* (2006.01)
*G01F 23/24* (2006.01)
*G01K 1/04* (2006.01)
*G01K 1/14* (2021.01)

(52) U.S. Cl.

CPC ............. *G01K 7/22* (2013.01); *G01F 23/243* (2013.01); *G01F 23/248* (2013.01); *G01K 1/045* (2013.01); *G01K 1/14* (2013.01)

(58) Field of Classification Search

CPC . G01K 7/22; G01K 1/045; G01K 1/14; G01F 23/243; G01F 23/248; G01F 23/241; G01F 23/242; G01F 23/0007
USPC .......................................................... 374/185
See application file for complete search history.

(56) References Cited

U.S. PATENT DOCUMENTS 5,056,363 A 10/1991 Arekapudi et al.
5,167,153 A 12/1992 McQueen
5,534,853 A * 7/1996 Pioch ........................ H02H 3/00 324/624
8,763,455 B1 7/2014 Chang
10,247,087 B2 * 4/2019 Gubel ........................ F01P 3/20
2005/0265425 A1 12/2005 Heldberg
2019/0032958 A1 * 1/2019 Ohse ........................ F24H 15/20
2020/0400508 A1 12/2020 Hashemian et al.

FOREIGN PATENT DOCUMENTS

| | | | |
|---|---|---|---|
| CN | 208059931 | U | 11/2018 |
| EP | 1037028 | B1 | 11/2008 |
| EP | 3449225 | B1 | 9/2022 |
| FR | 2766267 | A1 | 1/1999 |
| GB | 1287097 | A | 8/1972 |
| JP | H11248512 | A | 9/1999 |
| JP | 2004294208 | A | 10/2004 |

OTHER PUBLICATIONS

European Search Report for Application No. 24182325.1, mailed Oct. 30, 2024, 10 pages.

* cited by examiner

*Primary Examiner* — John E Breene
(74) *Attorney, Agent, or Firm* — CANTOR COLBURN LLP

(57) ABSTRACT

A dual-use level and temperature probe includes a stem configured to contact liquid, at least one sensor coupled to the stem, and a controller in signal communication with the sensor. The sensor includes an input terminal configured to receive electrical current and an output terminal configured to provide a return path for the electrical current. The controller is configured to deliver the input current to the input terminal and configured to monitor a voltage across the input and output terminals. The controller is configured to perform both a liquid level measurement and a temperature measurement based on the voltage.

18 Claims, 4 Drawing Sheets

DUAL-USE LEVEL AND TEMPERATURE PROBE

BACKGROUND

The present disclosure relates to aircraft sensors, and more particularly, to aircraft liquid level and temperature probes.

Aircrafts utilize separate sensors to measure both liquid level and temperature. For example, the aircraft's water system may utilize one sensor to measure the temperature of water in a tank and one or more other sensors to measure the level of the water in the tank. The need to employ multiple sensors to measure the level and temperature of liquid in the tank increases the overall complexity, weight, and costs of the aircraft's hot water system.

SUMMARY

According to a non-limiting embodiment, a dual-use level and temperature probe includes a stem configured to contact liquid, at least one sensor coupled to the stem, and a controller in signal communication with the sensor. The sensor includes an input terminal configured to receive electrical current and an output terminal configured to provide a return path for the electrical current. The controller is configured to deliver the input current to the input terminal and configured to monitor a voltage across the input and output terminals. The controller is configured to perform both a liquid level measurement and a temperature measurement based on the voltage.

In addition to one or more non-limiting embodiments, or in the alternative, the sensor is a resistive temperature device.

In addition to one or more non-limiting embodiments, or in the alternative, the resistive temperature device is a thermistor.

In addition to one or more non-limiting embodiments, or in the alternative, the controller is configured to vary a current level of the input current and to determine a temperature associated with the resistive temperature device based on the measurement signal.

In addition to one or more non-limiting embodiments, or in the alternative, the controller is configured to perform the liquid level measurement liquid level measurement during a first time duration and is configured to perform the temperature measurement during a second time duration different from the first time duration.

In addition to one or more non-limiting embodiments, or in the alternative, the controller performs the liquid level measurement in response to performing the operations of delivering a first amount of the electrical current to the input terminal to induce resistive heating of the resistive temperature device; in response to producing resistive heat, halting delivery of the electrical current to the resistive temperature device; measuring the voltage across the resistive temperature device indicative of a resistance and monitoring a decay rate of the resistance; and determining a temperature decay rate associated with the resistive temperature device based on the decay rate of the resistance.

In addition to one or more non-limiting embodiments, or in the alternative, the liquid level measurement further comprises: determining, by the controller, the stem is disposed in a presence the liquid in response to the temperature decay rate being equal to or exceeding to a decay threshold; and determining that the stem is not in the presence of the liquid in response to the temperature decay rate being less than the decay threshold.

In addition to one or more non-limiting embodiments, or in the alternative, the controller performs the temperature measurement after determining the presence of liquid, and generates an alert in response to determining the stem is not in the presence of the liquid.

In addition to one or more non-limiting embodiments, or in the alternative, the controller performs the temperature measurement in response to performing the operations of delivering a second amount of the electrical current to the first input terminal that is less than the first amount of the electrical current; measuring the voltage across the input and output terminals of the resistive temperature device; determining a resistance of the resistive temperature device based on the voltage; determining a temperature of the resistive temperature device based on the resistance; and determining a temperature of the liquid based on the temperature of the resistive temperature device.

According to another non-limiting embodiment, a dual-use level and temperature probe comprises a first sensor coupled to the stem, a second sensor coupled to the stem, and a controller in signal communication with the first sensor and the second sensor. The first sensor includes a first input terminal configured to receive a first electrical current and a first output terminal configured to output the first electrical current. The second sensor includes a second input terminal configured to receive a second electrical current and a second output terminal configured to output the second electrical current. The controller is configured to deliver the first electrical current to the first input terminal and the second electrical current to the second input terminal, and is configured to monitor a first voltage across the first input and output terminals and to monitor a second voltage across the second input and output terminals. The controller is configured to perform a liquid level measurement based on the first voltage and to perform a temperature measurement based on the second voltage.

In addition to one or more non-limiting embodiments, or in the alternative, the first sensor and the second sensor are each a resistive temperature device.

In addition to one or more non-limiting embodiments, or in the alternative, the first sensor is a first type of resistive temperature device and the second sensor is a second type of resistive temperature device.

In addition to one or more non-limiting embodiments, or in the alternative, at least one of the first resistive temperature device and the second resistive temperature device is a thermistor.

In addition to one or more non-limiting embodiments, or in the alternative, the controller is configured to perform both the liquid level measurement and the temperature measurement simultaneously.

In addition to one or more non-limiting embodiments, or in the alternative, the controller performs the liquid level measurement in response to performing the operations of delivering the first electrical current having a first current level to the first input terminal to induce resistive heating of the first resistive temperature device; in response to producing resistive heat from the first resistive temperature device, halting delivery of the first electrical current to the first resistive temperature device; receiving the first voltage signal from the first resistive temperature device indicative of a resistance; monitoring the decay rate of the resistance;

and determining a temperature decay rate associated with the first resistive temperature device based on the decay rate of the resistance.

In addition to one or more non-limiting embodiments, or in the alternative, the liquid level measurement further comprises determining, by the controller, the stem is disposed in a presence of the liquid in response to the temperature decay rate being equal to or exceeding to a decay threshold; and determining that the stem is not in the presence of the liquid in response to the temperature decay rate being less than the decay threshold.

In addition to one or more non-limiting embodiments, or in the alternative, the controller performs the temperature measurement in response to performing the operations of delivering the second electrical current having a second current level to the second input terminal, the second electrical current having a current level that is less than the first current level; receiving the second voltage from the resistive temperature device indicative of a resistance of the resistive temperature device; determining a temperature of the resistive temperature device based on the second voltage; and determining a temperature of the liquid based on the temperature of the resistive temperature device.

In addition to one or more non-limiting embodiments, or in the alternative, the second electrical current is a current pulse.

In addition to one or more non-limiting embodiments, or in the alternative, the second current level of the current pulse is less than a current threshold that induces resistive heating of the second resistive temperature device.

According to another non-limiting embodiment, a method of performing a liquid level measurement and a liquid temperature measurement using a single resistive temperature device comprises coupling a single sensor to a stem configured to contact liquid and delivering an electrical current from a controller to an input terminal of the sensor, and outputting the electrical current flowing through the sensor to the controller via an output terminal of the sensor. The method further comprises monitor a voltage across the input and output terminals using the controller; and performing both the liquid level measurement and the temperature measurement based on the voltage.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
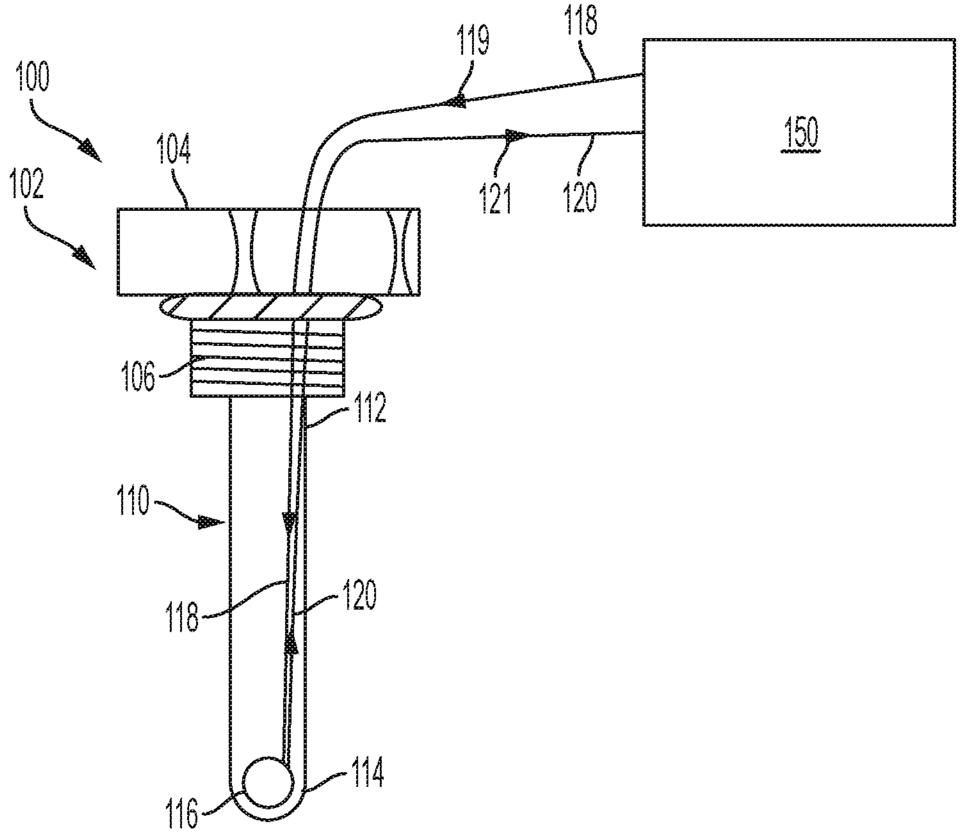
FIG. 1 depicts a dual-use liquid and temperature probe according to a non-limiting embodiment of the present disclosure.

Currently, aircraft water heating systems typically employ two sensors to detect liquid presence and liquid temperature, rather than a single probe that can perform both level measurement and temperature measurement of liquid contained in a tank. Thermistors are Resistive Temperature Devices (RTDs) which operate using a resistance-to-temperature correlation principle. More specifically, as the temperature of a metal increases, so does the resistance to the flow of electricity. A current can be passed through the RTD and the voltage across the resistance element of the RTD can be used to measure the resistance of the device, which directory correlates to its temperature. For example, as the temperature of the resistance element increases the electrical resistance also increases, thereby allowing electrical resistance to be measured in Ohms. The resistance value can then be converted into temperature based on the characteristics of the element.

RTDs also have an inherent current threshold when measuring temperature (as they can self-heat if too much current is used) and this characteristic can be utilized to detect liquid level. When the current flowing through the thermistor exceeds a minimum level, the thermistor begins to produce a resistive heating effect which while detrimental for temperature measuring, can be beneficial for liquid presence measuring.

When using a thermistor to measure liquid level (i.e., when used as a point-level sensor), current having a level that exceeds the current threshold is used to induce resistive heating. The temperature decay rate of the thermistor is then monitored (e.g., by a controller), which varies depending upon if it is in air or water (or any heat-conductive medium). When using the thermistor as a temperature sensor, however, it is important to limit the thermistor current because the resistive heating effect reduces the accuracy of the temperature reading. Therefore, a single conventional thermistor cannot typically be utilized to accurately perform both liquid level measurement and liquid temperature measurement in an aircraft hot water heating system.

Various embodiments of the present disclosure solve the shortcomings of conventional thermistors by providing a dual-use liquid and temperature probe that can be employed in an aircraft hot water heating system to perform both liquid level measurement and liquid temperature measurement. According to a non-limiting embodiment, the dual-use liquid and temperature probe utilizes a single thermistor that operates according to an algorithm which selectively invokes the level measurement function and the temperature measurement function. In another non-limiting embodiment, the dual-use liquid and temperature probe implements a first thermistor configured to perform liquid level measurement and a second thermistor configured to perform liquid temperature measurement. The outputs of the first and second thermistors are delivered to a controller, which can simultaneously process the first and second thermistor outputs to perform both liquid level measurement and liquid temperature measurement.

With reference now to FIG. 1, a dual-use liquid and temperature probe 100 is illustrated according to a non-limiting embodiment of the present disclosure. The dual-use liquid and temperature probe 100 includes a mounting fixture 102 and a stem 110. Various types of mounting systems can be implemented such as, for example, a thread fixture, o-ring seal, and other capture-and-hold fixtures. The threaded fixture 102 includes a cap 104 and a threaded portion 106 that is coupled to the bottom end of the cap 104. In one or more non-limiting embodiments, the stem 110 can be inserted through a hollow mating boss (not shown) that is included in a liquid tank (e.g., water tank) and the threaded fixture 102 can be screwed into the mating boss until the cap 104 stops thereon.

The stem 110 includes a proximate end 112 that is coupled to the threaded portion 106 and extends continuously to a closed distal end 114. The stem 110 further includes a resistive temperature device (RTD) 116 disposed in distal end 114 of the stem 110. According to a non-limiting embodiment, the RTD 116 is a thermistor, but it should be appreciated that other types of RTDs 116 can be utilized without departing from the scope of the invention.

The RTD 116 includes an input terminal 118 and an output terminal 120. The input terminal 118 and the output terminal 120 are configured to establish signal communication with a controller 150. The input terminal 118 receives an input current 119 generated by the controller 150, while the output terminal 120 returns this measurement signal 121 to the controller 150.

The controller 150 is configured to vary the current level of the input current 119 and is configured to determine a temperature associated with the RTD 116. For example, the controller 150 can deliver the input current to the input terminal and configured to monitor a voltage across the input and output terminals, and perform both a liquid level measurement and a temperature measurement based on the voltage appearing across terminals 118 and 120.

To perform liquid level measurements, the controller 150 can deliver an amount of current (e.g., a first current level) to the RTD 116 that will induce resistive heating. In one or more non-limiting embodiments, the controller 150 outputs current 119 having a current level that is greater than the current threshold of the RTD 116 known to induce resistive heating. Once the RTD 116 is heated, the current 119 is reduced and the controller 150 monitors the decay rate of the resistance of sensor 116. According a non-limiting embodiment, the decay rate of the resistance can be determined by inducing electrical current flow through the sensor 116 and then monitoring the voltage across leads 118 and 120. According to another non-limiting embodiment, the decay rate of the resistance can be determined by applying electrical voltage across the leads 118 and 120 and then monitoring the current flow through the sensor 116. When the decaying strength of the measurement voltage across 118 and 120 is equal to or exceeds a decay threshold, the controller 150 determines that the stem 110 is disposed in the presence of surrounding liquid, (or other heat-conductive medium, including ice). When, however, the decaying strength of the measurement voltage across terminals 118 and 120 is below the decay threshold, the controller 150 determines that no liquid is present or surrounding the stem 110. Such an event could indicate, for example, that the liquid has fallen below a target liquid level or the liquid has drained completely from the tank.

For temperature measurements, the controller 150 delivers a second amount of current to the RTD 116 that is less than the amount generated when performing the liquid level measurement (e.g., less than the current threshold of the RTD 116). In one or more non-limiting embodiments, the current is delivered using one or more short pulses of current. In this manner, the controller 150 can measure the resistance of the RTD based on the voltage measurement across terminals 118 and 120, for example, and determine a present temperature of the RTD 116 indicative of the present temperature of the surrounding liquid based on the resistance indicated by the measured voltage across terminals 118 and 120. Because the controller 150 ensures that the level of the input current is below the heating current threshold, and because the current is only pulsed on for a short duration, the resulting temperature measurements remain accurate and are not susceptible to inaccuracies caused by resistive heating.

According to a non-limiting embodiment, the controller 150 utilizes an algorithm (e.g., stored in the memory of the controller 150) to selectively perform the liquid level measurements and temperature measurements described above. For example, the controller 150 executing the algorithm may not initialize heater activation and invoke the temperature measurement mode to perform liquid temperature measurements until the dual-use liquid and temperature probe 100 first detects liquid. Once liquid is detected, the controller 150 invokes liquid heating along with the temperature measurement mode to monitor that liquid's temperature. The controller 150 then runs an optimized algorithm to alternate between monitoring liquid presence and liquid temperature. While the temperature is less than or equal to a temperature threshold, the controller 150 can continue monitoring the temperature of the liquid. When, however, the monitored temperature exceeds a temperature threshold, the controller 150 can determine the liquid has possibly fallen below a level threshold, and then invoke the level measurement mode. In this manner, the dual-use liquid and temperature probe 100 can be employed in an aircraft hot water heating system to perform both liquid level measurement and liquid temperature measurement.

In another example, the algorithm can command the controller 150 to intermittently switch between the level measuring mode and the temperature measuring mode according to a set time period, e.g., every 30 seconds. In this manner, a greater number of liquid level measurements can be obtained rather than waiting until the temperature measurement exceeds the temperature threshold before invoking the level measurement mode.

Figure 2:
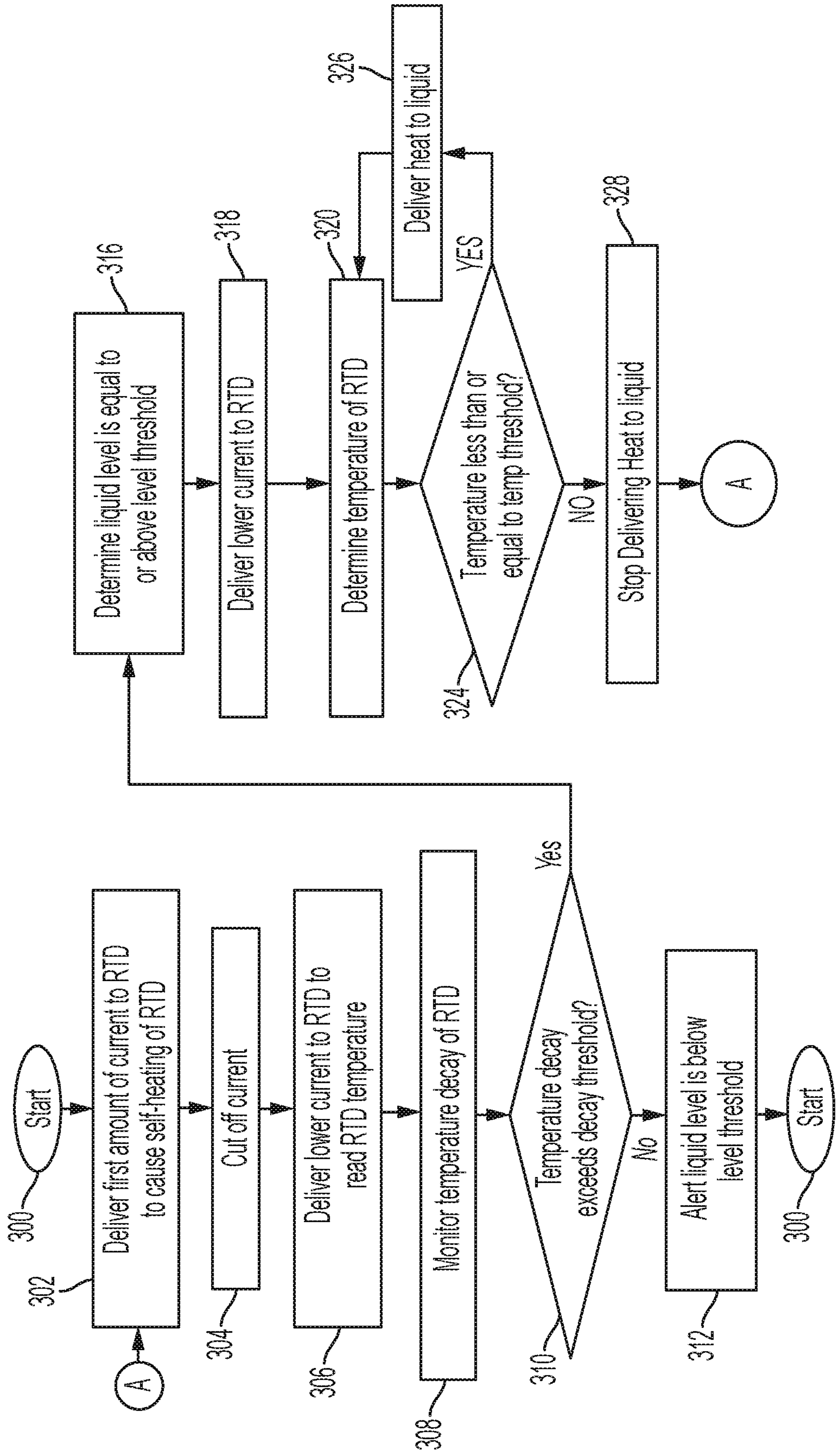
FIG. 2 is a flow diagram illustrating a method of performing liquid level measurements and liquid temperature measurements using a single dual-use liquid level and temperature probe depicted in FIG. 1 according to a non-limiting embodiment of the present disclosure.

Referring to FIG. 2, a method of performing liquid level measurements and liquid temperature measurements using a single RTD probe depicted in FIG. 1 in a dual-use liquid level and temperature application is illustrated according to a non-limiting embodiment of the present disclosure. The method begins at operation 300, and delivers a first amount of current to an RTD included in the probe 100 at operation 302 to generate resistive heating of RTD sensor. At operation 304, the first amount of current is cut off a lower current is delivered to the RTD at operation 306. At operation 308, and monitoring temperature (e.g., by the controller 150) in response to the delivered lower current is monitored at operation 308. At operation 310, a determination is made (e.g., by the controller 150) as to whether the temperature decay exceeds a decay threshold. When the temperature decay does not exceed the decay threshold, an alert is generated (e.g., by the controller 150) that the liquid level is below a liquid level threshold at operation 312, and the method re-starts at operation 300.

When, however, the temperature decay exceeds the decay threshold, the method proceeds to operation 316 and determines liquid level is equal to or above the level threshold. At operation 318, a second amount of current less than the first amount of current is delivered to the RTD to support reading the RTD temperature. At operation 320, the present temperature of the RTD is determined (e.g., by the controller 150). At operation 324, a determination is made (e.g., by the controller 150) as to whether the temperature is less than or equal to a temperature threshold. When true, the controller then applies heat to the liquid at operation 326 and returns to operation 320 to continue determining the temperature of the liquid. When, however, the temperature exceeds the temperature threshold, the method stops delivering heat to the liquid at operation 328, and returns to operation 302 and delivers the first amount of current to the RTD to invoke the liquid level measuring operation described in detail above to confirm whether the liquid has fallen below the liquid level threshold.

Figure 3:
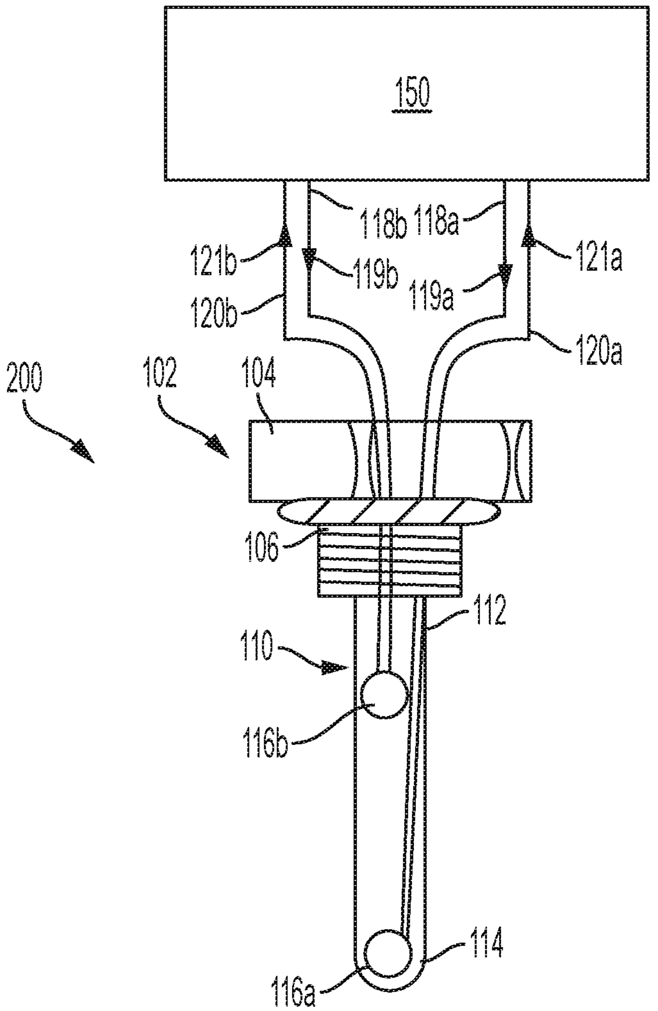
FIG. 3 depicts a dual-use liquid and temperature probe according to a non-limiting embodiment of the present disclosure.

Turning now to FIG. 3 a dual-use liquid and temperature probe 200 is illustrated according to another non-limiting embodiment of the present disclosure, where like reference numerals represent like parts. Therefore, a detailed description of previously described parts and their respective functionalities will not be repeated for the sake of brevity.

The dual-use liquid and temperature probe 200 includes a stem 110 that contains two individual RTDs 116*a* and 116*b*. A first RTD 116*a* can be located at the stem distal end 114 and a second RTD 116*b* can be located the proximate end 112. In this example, the first RTD 116*a* is utilized as a liquid level measurement sensor while the second RTD 116*b* is utilized as a temperature measurement sensor. It should be appreciated, however, that the first RTD 116*a* can be utilized as a temperature sensor while the second RTD 116*b* can be utilized as a liquid level measurement sensor. In any case, the first and second RTDs 116*a* and 116*b* can be implemented as a thermistor or other type of RTD. In one or more non-limiting embodiments, the first and second RTDs 116*a* and 116*b* can be the same type of RTD. In other non-limiting embodiments, the first RTD 116*a* can be a first type of RTD, while the second RTD 116*b* can a different second type of RTD. In other non-limiting embodiments, both sensors can function as redundant temperature or level sensors.

The first RTD 116*a* includes a first input terminal 118*a* and a first output terminal 120*a*. The first input terminal 118*a* and the first output terminal 120*a* are configured to establish signal communication between the first RTD 116*a* and a controller 150. The first input terminal 118*a* receives a first input current 119*a* generated by the controller 150, while the first output terminal 120*a* delivers a first measurement signal 121 (e.g., output current) to the controller 150.

Likewise, the second RTD 116*b* includes a second input terminal 118*b* and a second output terminal 120*b*. The second input terminal 118*b* and the second output terminal 120*b* are configured to establish signal communication between the second RTD 116*b* and the controller 150. The second input terminal 118*b* receives a second input current 119*b* generated by the controller 150, while the second output terminal 120*b* delivers a second measurement signal 121*b* (e.g., output current) to the controller 150.

To perform liquid level measurements, the controller 150 delivers an amount of current 119*a* (e.g., a first current level) to the first RTD 116 via the first input terminal 118*a* that will induce resistive heating. In one or more non-limiting embodiments, the controller 150 outputs current 119*a* having a current level that is greater than the current threshold of the first RTD 116*a* known to induce resistive heating. Once the first RTD 116*a* is heated, the heavier current is cut off while a lower current sufficient to measure RTD temperature continues, and the controller 150 monitors the decay of the signal strength (e.g., voltage) across terminals 118*a* and 120*a* which is indicative of the temperature decay of the first RTD 116*a*. When the decaying strength of the first measurement voltage across signals terminals 118*a* and 120*a* (within a preset window of time) is equal to or above a decay threshold, the controller 150 determines that the stem 110 is disposed in the presence of surrounding liquid (or other heat-conductive medium). When, however, the decaying strength of the first measurement voltage across terminals 118*a* and 120*a* (within the same preset window of time) falls below the decay threshold, the controller 150 determines that no liquid is present or surrounding the stem 110.

For temperature measurement, the controller 150 delivers an amount of current 119*b* (e.g., a second current level) to the second RTD 116*b* via the second input terminal 118*b* that is less than the amount of current 119*a* delivered to the first RTD 116*a* when performing the liquid level measurement (e.g., less than the current threshold of the first RTD 116*a*). In this manner, the controller 150 measures the resistance of the second RTD 116*b* based on the second voltage measurement across terminals 118*b* and 120*b*, and determines a present temperature of the second RTD 116*b* so as to determine the present temperature of the surrounding liquid. In one or more non-limiting embodiments, the controller 150 can simultaneously deliver the first and second currents 119*a* and 119*b* to the first and second RTDs 116*a* and 116*b* via terminals 118*a* and 118*b*, respectively. Likewise, the controller 150 can simultaneously process the first and second voltages appearing across terminals 118*a* and 120*b* and 118*b* and 120*b* to simultaneously perform level measurements and temperature measurements of the liquid. In this manner, the dual-use liquid and temperature probe 200 can be employed in an aircraft hot water heating system to perform both liquid level measurement and liquid temperature measurement with a single probe, rather than having multiple probes mounted in system to individually measure both water temperature and level.

Figure 4:
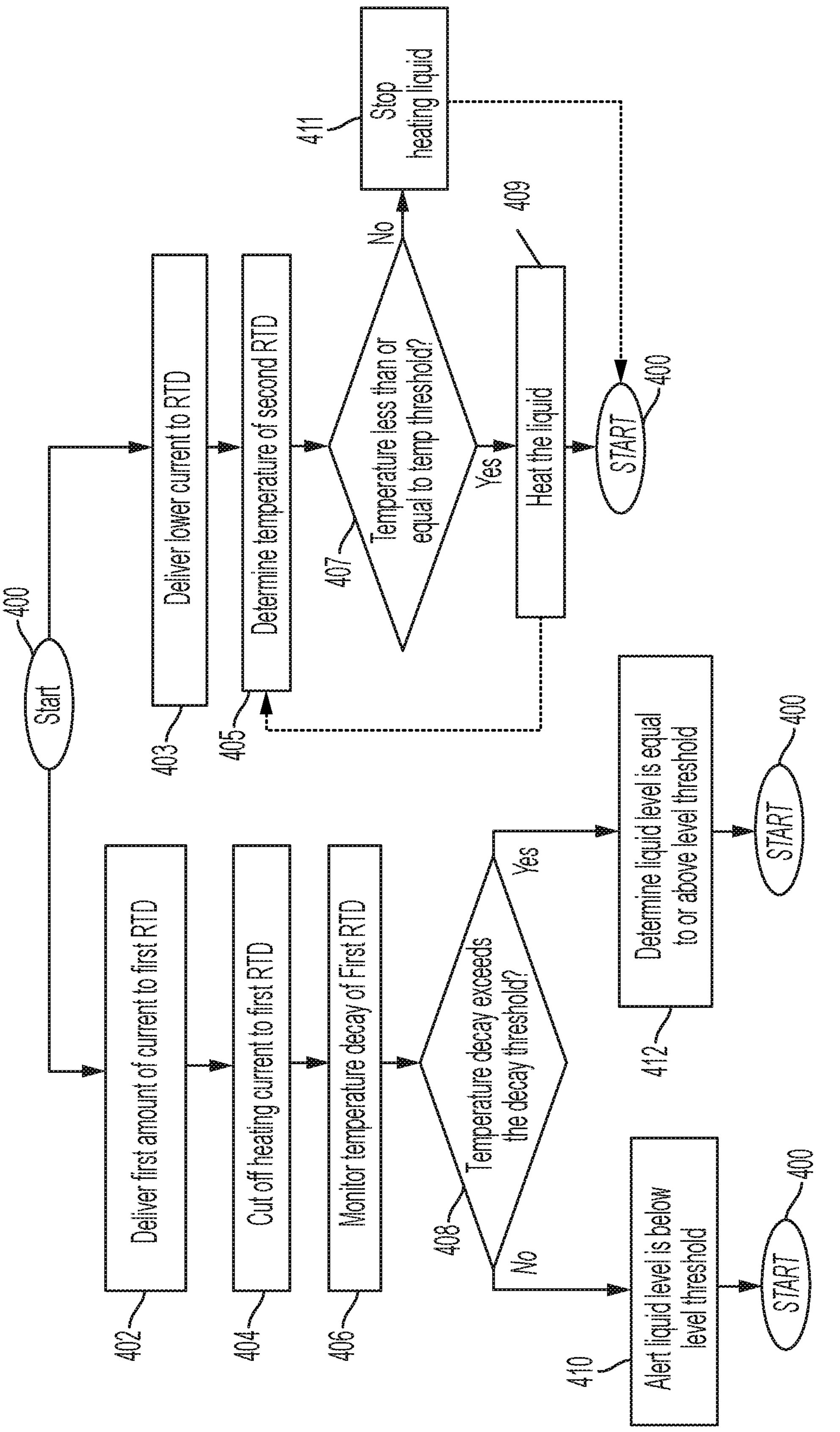
FIG. 4 is a flow diagram illustrating a method of performing liquid level measurements and liquid temperature measurements using a single dual-use liquid level and temperature probe depicted in FIG. 3 according to another non-limiting embodiment of the present disclosure.

Turning to FIG. 4, a method of performing liquid level measurements and liquid temperature measurements using a single dual-use liquid level and temperature probe 200 depicted in FIG. 3 is illustrated according to another non-limiting embodiment of the present disclosure. When the method begins at 400, a first amount of current is delivered to a first RTD included in the single dual-use liquid level and temperature probe at operation 402 and the first RTD generates resistive heat in response to the first amount of current flowing therethrough, and At operation 404, the first amount of current is cut off and the temperature decay of the first RTD is monitored at operation 406.

At operation 408, a determination is made as to whether the temperature decay exceeds a decay threshold. When the temperature decay is below the decay threshold, an alert is generated (e.g., by the controller 150) that the liquid level is below a liquid level threshold at operation 410, and the method restarts at operation 400. When, however, the temperature decay is greater than the decay threshold, it is determined (e.g., by the controller 150) at operation 412 that the liquid is equal to or greater than the liquid level threshold at operation 416 and the method restarts at operation 400.

Turning to operation 403, a second amount of current less than the first among of current is delivered to a second RTD included in the single dual-use liquid level and temperature probe. It should be appreciated that the first current (i.e., operation 402) and the second current (i.e., operation 403) can be output (e.g., by the controller 150) simultaneously or can be output at different times. At operation 405, the temperature of the second RTD is determined (e.g., by the controller 150). At operation 407, a determination is made (e.g., by the controller 150) as to whether the temperature is less than or equal to a temperature threshold. If true, the controller enables heating of the liquid at operation 409 and then returns to operation 405 and continues determining the temperature of the second RTD. When, however, the temperature exceeds the temperature threshold, the heating can be disabled/stopped at operation 411, and the method restarts to operation 400.

As described herein, various embodiments of the present disclosure provide a dual-use liquid and temperature probe that can be employed in an aircraft hot water heating system to perform both liquid level measurement and liquid temperature measurement. Accordingly, the dual-use liquid and temperature probe described herein provides technical effects and benefits including reducing cost and weight of an aircraft water system, also simplifying the assembly and design of a water tank (e.g., the aircraft hot water tank).

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A dual-use level and temperature probe comprising:
a stem configured to contact liquid;
a sensor coupled to the stem, the sensor including an input terminal configured to receive electrical current and an output terminal configured to provide a return path for the electrical current; and
a controller in signal communication with the sensor, the controller configured to deliver the input current to the input terminal and configured to monitor a voltage across the input and output terminals,
wherein the controller is configured to perform both a liquid level measurement and a temperature measurement based on the voltage,
wherein the controller performs the liquid level measurement in response to performing the following operations:
delivering a first amount of the electrical current to the input terminal to induce resistive heating of the resistive temperature device;
in response to producing resistive heat, halting delivery of the first amount of electrical current to the resistive temperature device, and delivering a second amount of electrical current that is less than the first amount of electrical current;
measuring the voltage across the resistive temperature device indicative of a resistance and monitoring a decay rate of the resistance following delivery of the second amount of electrical current; and
determining a temperature decay rate associated with the resistive temperature device based on the decay rate of the resistance,
wherein the controller continuously alternates between performing the liquid level measurement and performing the temperature measurement, and in response to a measured temperature exceeding a temperature threshold, and halts performing the temperature measurement so as to prevent heating liquid while continuing to perform the liquid level measurement.

2. The dual-use level and temperature probe of claim 1, wherein the sensor is a resistive temperature device.

3. The dual-use level and temperature probe of claim 2, wherein the resistive temperature device is a thermistor.

4. The dual-use level and temperature probe of claim 2, wherein the controller is configured to vary a current level of the input current and to determine a temperature associated with the resistive temperature device based on the measurement signal.

5. The dual-use level and temperature probe of claim 4, wherein the controller is configured to perform the liquid level measurement during a first time duration and is configured to perform the temperature measurement during a second time duration different from the first time duration.

6. The dual-use level and temperature probe of claim 4, wherein the liquid level measurement further comprises:
determining, by the controller, the stem is disposed in the presence of the liquid in response to the temperature decay rate being equal to or exceeding to a decay threshold; and
determining that the stem is not in the presence of the liquid in response to the temperature decay rate being less than the decay threshold.

7. The dual-use level and temperature probe of claim 6, wherein the controller performs the temperature measurement after determining the presence of liquid, and generates an alert in response to determining the stem is not in the presence of the liquid.

8. The dual-use level and temperature probe of claim 6, wherein the controller performs the temperature measurement in response to performing the following operations:
delivering a second amount of the electrical current to the first input terminal that is less than the first amount of the electrical current;
measuring the voltage across the input and output terminals of the resistive temperature device;
determining a resistance of the resistive temperature device based on the voltage;
determining a temperature of the resistive temperature device based on the resistance; and
determining a temperature of the liquid based on the temperature of the resistive temperature device.

9. A dual-use level and temperature probe comprising:
a stem configured to contact liquid;
a first sensor coupled to the stem, the first sensor including a first input terminal configured to receive a first electrical current and a first output terminal configured to output the first electrical current;
a second sensor coupled to the stem, the second sensor including a second input terminal configured to receive a second electrical current and a second output terminal configured to output the second electrical current;

a controller in signal communication with the first sensor and the second sensor, the controller configured to deliver the first electrical current to the first input terminal and the second electrical current to the second input terminal, and configured to monitor a first voltage across the first input and output terminals and to monitor a second voltage across the second input and output terminals, wherein the controller is configured to perform a liquid level measurement based on the first voltage and to perform a temperature measurement based on the second voltage, wherein the controller performs the liquid level measurement in response to performing the following operations:

delivering the first electrical current having a first current level to the first input terminal to induce resistive heating of the first resistive temperature device;

in response to producing resistive heat from the first resistive temperature device, halting delivery of the first electrical current to the first resistive temperature device, and delivering a second amount of electrical current that is less than the first amount of electrical current;

receiving the first voltage signal from the first resistive temperature device indicative of a resistance following delivery of the second amount of electrical current;

monitoring the decay rate of the resistance; and determining a temperature decay rate associated with the first resistive temperature device based on the decay rate of the resistance, wherein the controller continuously alternates between performing the liquid level measurement and performing the temperature measurement, and in response to a measured temperature exceeding a temperature threshold, and halts performing the temperature measurement so as to prevent heating liquid while continuing to perform the liquid level measurement.

10. The dual-use level and temperature probe of claim 9, wherein the first sensor and the second sensor are each a resistive temperature device.

11. The dual-use level and temperature probe of claim 10, wherein the first sensor is a first type of resistive temperature device and the second sensor is a second type of resistive temperature device.

12. The dual-use level and temperature probe of claim 11, wherein at least one of the first resistive temperature device and the second resistive temperature device is a thermistor.

13. The dual-use level and temperature probe of claim 10, wherein the controller is configured to perform both the liquid level measurement and the temperature measurement simultaneously.

14. The dual-use level and temperature probe of claim 10, wherein the liquid level measurement further comprises:

determining, by the controller, the stem is disposed in a presence of the liquid in response to the temperature decay rate being equal to or exceeding to a decay threshold; and determining that the stem is not in the presence of the liquid in response to the temperature decay rate being less than the decay threshold.

15. The dual-use level and temperature probe of claim 14, wherein the controller performs the temperature measurement in response to performing the following operations:

delivering the second electrical current having a second current level to the second input terminal, the second electrical current having a current level that is less than the first current level;

receiving the second voltage from the resistive temperature device indicative of a resistance of the resistive temperature device;

determining a temperature of the resistive temperature device based on the second voltage; and determining a temperature of the liquid based on the temperature of the resistive temperature device.

16. The dual-use level and temperature probe of claim 15, wherein the second electrical current is a current pulse.

17. The dual-use level and temperature probe of claim 16, wherein the second current level of the current pulse is less than a current threshold that induces resistive heating of the second resistive temperature device.

18. A method of performing a liquid level measurement and a liquid temperature measurement using a single resistive temperature device, the method comprising:

coupling a single sensor to a stem configured to contact liquid;

delivering an electrical current from a controller to an input terminal of the sensor, and outputting the electrical current flowing through the sensor to the controller via an output terminal of the sensor;

monitor a voltage across the input and output terminals using the controller; and performing both the liquid level measurement and the temperature measurement based on the voltage, wherein the controller performs the liquid level measurement in response to performing the following operations:

delivering the first electrical current having a first current level to the first input terminal to induce resistive heating of the first resistive temperature device;

in response to producing resistive heat from the first resistive temperature device, halting delivery of the first electrical current to the first resistive temperature device, and delivering a second amount of electrical current that is less than the first amount of electrical current;

receiving the first voltage signal from the first resistive temperature device indicative of a resistance following delivery of the second amount of electrical current;

monitoring the decay rate of the resistance; and determining a temperature decay rate associated with the first resistive temperature device based on the decay rate of the resistance;

continuously alternating between performing the liquid level measurement and performing the temperature measurement;

and in response to a measured temperature exceeding a temperature threshold, halting performing the temperature measurement so as to prevent heating the liquid while continuing to perform the liquid level measurement.

* * * * *